PM031 XR 3,787,837

United States Patent [19]

Allen et al.

[11] 3,787,837

[45] Jan. 22, 1974

[54] MODULAR OPTICAL APPARATUS

[75] Inventors: Charles A. Allen; Richard W. Bryant, both of Poughkeepsie; Thomas J. Delaney, Stanfordville; Vir A. Dhaka, Hopewell Junction; Robert M. Meade, Wassaic; James D. Wharmby, Poughkeepsie, all of N.Y.

[73] Assignee: Cogar Corporation, Wappinger Falls, N.Y.

[22] Filed: Apr. 19, 1971

[21] Appl. No.: 135,152

[52] U.S. Cl. .............. 340/365 P, 197/98, 178/17 D

[51] Int. Cl. ............................................ G06f 3/02

[58] Field of Search .......... 340/365, 365 P; 197/98; 235/145; 178/17 D

[56] References Cited

UNITED STATES PATENTS

| | | | |
|---|---|---|---|
| 3,377,485 | 4/1968 | Amada | 340/365 X |
| 3,571,600 | 3/1971 | Rubin | 250/219 D |
| 3,579,047 | 5/1971 | Sturm | 340/365 X |
| 3,056,030 | 9/1962 | Kelchner | 178/17 D |
| 3,519,116 | 7/1970 | Koehn | 340/365 X |
| 2,641,753 | 6/1953 | Oliwa | 340/365 |
| 2,408,754 | 10/1946 | Bush | 178/17 D |
| 3,499,515 | 3/1970 | Mikrut | 197/98 |
| 2,476,257 | 7/1949 | Hoff | 116/114 |

OTHER PUBLICATIONS

IBM Technical Disclosure Vol. 3, No. 11, April 1961, p. 44 "Photo Keyboard" by Lyncott

*Primary Examiner*—John W. Caldwell
*Assistant Examiner*—Robert J. Mooney
*Attorney, Agent, or Firm*—Harry M. Weiss; Gottlieb, Rackman & Reisman

[57] ABSTRACT

This is modular keyboard utilizing fiber optics for signalling. Each keyboard module includes a common light source for illuminating a group of optical fibers. One optical fiber is provided for each key, and transmission of light by the fiber is permitted only when the corresponding key is depressed, withdrawing a shutter element from a gap in the fiber. The coherent light outputs are furnished to a housing mounted in a ceramic module which couples the light outputs to respective photodetecting elements on a semiconductor chip which is also mounted on the ceramic module. The keyboard modules and individual keys are also replaceable, thus providing low out-of-operation time and character versatility.

23 Claims, 10 Drawing Figures

INVENTORS
CHARLES A. ALLEN
RICHARD W. BRYANT
THOMAS J. DELANEY
VIR A. DHAKA
ROBERT M. MEADE
JAMES D. WHARMBY

BY Gottlieb, Rackman & Reisman
Harry M Weiss
ATTORNEYS

MODULAR OPTICAL APPARATUS

This invention relates to keyboards, and in particular, to keyboards comprised of modular sections and utilizing light as the basic control parameter.

The increasing need for reliable keyboard devices has been apparent for some time. That need grows with the development of each new data input requirement in various industries. Moreover, it is not only in conventional data processing where keyboards find increasing application, but in a wide variety of computation devices as well, including calculators, high-speed office typewriters, and the like. But perhaps the most pressing need for reliable and truly high-speed keyboards does exist in the field of data processing where speed is always at a premium. This field exhibits a constant demand for rapid and reliable entry of data into processing or storage systems.

Many different types or styles of keyboards have been used heretofore. However, the typical keyboard has relied on mechanical contacts where an operator's pressure on a key results in the key's being physically depressed, thereby bringing two opposing contacts together to initiate responsive action. Such mechanical keyboards have proven merely adequate in the past, and have resulted in a wide variety of problems, such as the "bouncing" of contacts (leading to irregular or uncertain contacts being made), gradual pitting and wearing out of contacts, accumulation of dirt on contact points, and the like—all of these typical mechanical contact problems sharply reduce the reliability of such keyboard systems. These types of mechanial keyboards have inherent limitations due to their physical characteristics. In order to make any significant improvements therefore, it is necessary to go to different types of keyboards, with, for example, different basic signalling and contact techniques.

Even where the inherent failings of mechanical keyboards have been recognized in the past, the shift to electronically controlled keyboards has not been totally satisfactory. Often, attempts have been made to reach a compromise between mechanical and electronic keyboards, resulting in hybrid devices which retain many of the old problems.

A related problem common to nearly all keyboards, regardless of type or signalling system used, is the wearing ouut of keys or groups of keys, and the limited versatility of the keyboards due to the fixed nature thereof. In the usual case, if a single key or a group of keys becomes defective, this represents a major repair job with the entire apparatus often having to be returned to a remote shop for overhaul. Since day-to-day servicing is usually necessary on nearly all keyboard devices, the limited replaceability of the keys is a servere restriction on the use of the machines incorporating the keyboards. This limitation also prevents the keyboard devices from having a greater range of application utilizing different character systems or portions thereof. A purchaser or user of such systems is thereby precluded from having keyboards customized to his own specifications, such as might be possible with a modularized replaceable system.

It is therefore an object of this invention to obviate one or more of the aforesaid difficulties.

It is another object of this invention to provide a keyboard which utilizes a reliable signalling system.

It is an additional object of this invention to provide a keyboard with replaceable keys and modular sections.

It is a still further object of this invention to eliminate traditional mechanical contacts in a keyboard system to improve reliability and flexibility of operation of the keyboard.

Additional objects and advantages of this invention will become apparent when considered in connection with one particular illustrative embodiment of the invention wherein a modular keyboard section is disclosed. The keyboard can be comprised of a number of such modules, placed, for example, in side-by-side relation. Each module includes its own set of keys and its own signalling system providing means for informing a central location on each module that a particular key has been depressed. When the modules of this invention are utilized in an actual machine, one or more of them will be placed into a machine housing to receive the appropriate number of modules for that particular machine application. The set of keys or character bars for each module, when placed in adjacent relationship with the next module, will form a logical set of characters. For example, in one particular illustrative embodiment of the invention, four of the modules will be used, each of which includes 16 characters, thereby providing a 64-character set when all four modules are considered. Since individual modules are to be used, the arrangement of characters and the sets possible are essentially unlimited. For each of the character sets, however, the same signalling system based upon the depression of keys will be utilized.

Considering a single module of the invention, a plurality of apertures are provided on a one-for-one basis for each key. These apertures act as seats for each key and also permit access from the bottom of each key to the underlying signalling system. The signalling relating to the depression of one or more keys of the keyboard is controlled by the transmission of light from a common light source through an optical fiber which is individual to each key. The light is transmitted, when the depression of an individual key allows it, to a typical semiconductor chip. Thus, in a case where the keyboard of the invention is utilized as part of an input device to a computer memory, a plurality of chips mounted on ceramic modules will be mounted on a single printed circuit board which will be common to all modularized sections of the keyboard. Illustratively, the ceramic modules can be coupled to the printed circuit boards by means of connector pins which thereby permit the transfer of information from the ceramic module. Light inputs indicative of individual keys having been depressed are received by photodetectors individual to each of the optical fibers and which are included on a typical semiconductor chip whicch is also affixed to the ceramic module. The corresponding individual optical fibers carrying the light outputs from each of the keys are coupled to the chip by means of a fiber optic housing which spaces each of the fibers from each other, for example, in a 4 × 4 array where 16 keys (and therefore 16 light outputs) are involved. One arrangement of the semiconductor chip and the underlying ceramic module or substrate is disclosed in application Ser. No. 62,298 filed Aug. 10, 1970, entitled "Photodetector Packaging Assembly" and assigned to the assignee of the present application.

The actual transmission of light indicative of the depressing of an individual key is achieved by utilizing a one-piece molded key element having integral therewith downwardly projecting shutter capable of interrupting the light path from the common light source to the photodetector assembly at the ceramic module. In particular, each key is seated in an aperture for vertical movement, and is supported on an underlying slotted frame. The key includes three resilient legs which in turn rest on corresponding ridges which are elevated from the base surface of the underlying frame. A transverse slot in the frame extends 1for the entire width of the module, thus accommodating the shutters for several keys, and gives access therethrough to the fiber optical transmission system which is contained under the support frame.

One of the resilient support legs of each key also includes a shutter stub which projects downwardly from the leg through the slot. Normally, the shutter stub extends beneath the slot and into a gap in the corresponding optical fiber which rests on a support plate. Thus, the normal condition for any associated key, shutter and optical fiber is that the shutter is disposed within the gap in the fiber, thereby preventing transmission of light from the common optical source to the photodetector assembly containing the semiconductor chip. However, when the key is depressed, the key body moves downward through its support seat, compressing its underlying resilient legs towards the main body of the key. In so deforming the resilient legs of the key, the shutter stub is elevated from the gap in the corresponding underlying optical fiber. This permits light to be transmitted from the common light source through the optical fiber, past the narrow gap in the fiber and on to the fiber optic housing, where the individual light output indicating the depression of the corresponding key is passed to the chip photodetecting means. The output of the photodetecting device can be used either to serve as an input directly to the equipment to be controlled by the photodetecting device output or to serve to supply an input to a semiconductor memory chip mounted on a ceramic substrate located on the common printed circuit board. The memory module can be used, for example, to change coding or for queuing. Thus, an indication is given to system associated with the keyboard that a particular key has been depressed. Other responsive electronic actions can be taken based upon the input of any partcular key or goup of keys.

Since replaceability of the various components of the keyboard modules of the invention is one of their significant advantages, several elements are made to be easily removed and changed, for example, when servicing is required. Thus, each individual key is normally retained in its corresponding seat by the presence of latches or ramp members on each of two opposite faces of the key body. During installation, these latches or ramps occupy a position outboard of the lower periphery of the seat for each key and thereby permit vertical articulation of the key from an upper rest position established by the resiliency of the key's underlying legs and latches to a lower operated position when the underlying resilient legs are compressed in response to the depressing of the key. When it is desired to remove or replace a key, a key extractor is lowered over an individual key with its two opposed gripping jaws positioned to depress the latches; in addition, two longer opposed gripping fingers simultaneously extend down the ramp members on the other two faces of the key to the point where the ends of the fingers pass over the ridge between the latches, thus releasing the latches. When the jaws and fingers are in position, a positive gripping relationship between the extractor and each of the faces of the key is established. Upward pressure on the extractor will then result in the withdrawal of the key from its seat.

Similar replaceability is provided for the light source which illuminates the optical fibers. This light source generally takes the form of a cylindrical lamp contained within a removable housing which is releasably attached to a hollow casing co-planar with the upper surface of the keyboard module. The lamp housing includes a cylindrical socket hole to receive the lamp, with the light output from the lamp being connected to a receptacle containing the input ends to each of the optical fibers. The lamp housing is mounted on the keyboard module casing and is retained thereon by the presence of longitudinal shoulder and slot arrangements on opposite sides of the housing. The housing is illustratively made of resilient material and includes opposed upstanding legs which can be compressed towards each other. When such compression takes place, the shoulder and slot in the housing are disengaged from the module casing, thereby permitting the lamp housing to be removed and giving access to the lamp which may be in need of servicing.

Finally, the replaceability aspect of the invention is also obtainable with respect to an entire keyboard module itself. Thus, if it is desired to change the characters of the keyboard system (e.g., from letters to numbers) or to change a particular group of chraracters in a keyboard (to revise a particular data code), or if indeed an entire module appears to be faulty, the printed circuit board which is common to the several adjacent modules is generally removed, thus permitting the module itself to be withdrawn from the system and a new module, having the necessary new characters or codes, is inserted in its place.

It is therefore a feature of an embodiment of this invention that a keyboard operates by normally preventing the transmission of light through an optical fiber and by permitting light transmission only when a corresponding key is depressed.

It is a further feature of an embodiment of this invention that a key of a keyboard system includes a shutter-like element adapted to be positioned in or withdrawn from a gap in an optical fiber, to respectively interrupt or permit light transmission, to control the output from a particular key.

It is also a feature of an embodiment of this invention that a common light source is provided for all the optical fibers of a modularized section of a keyboard, with discrete optical outputs from each fiber being transmitted to corresponding individual photodetectors.

It is yet another feature of an embodiment of this invention that a key of a keyboard system is of a molded one-piece construction and is removable with an extractor tool.

It is a still further feature of an embodiment of this invention that a keyboard includes replaceable modules with different key or character layouts utilizing the same underlying fiber optical light-interrupting shutter arrangement.

Additional objects, features and advantages of the present invention will become apparent when considered in conjunction with a presently preferred, but nonetheless illustrative, embodiment of the invention as explained in the following detailed description and as shown in the accompanying drawing, wherein.

Figures 7, 8, 9:
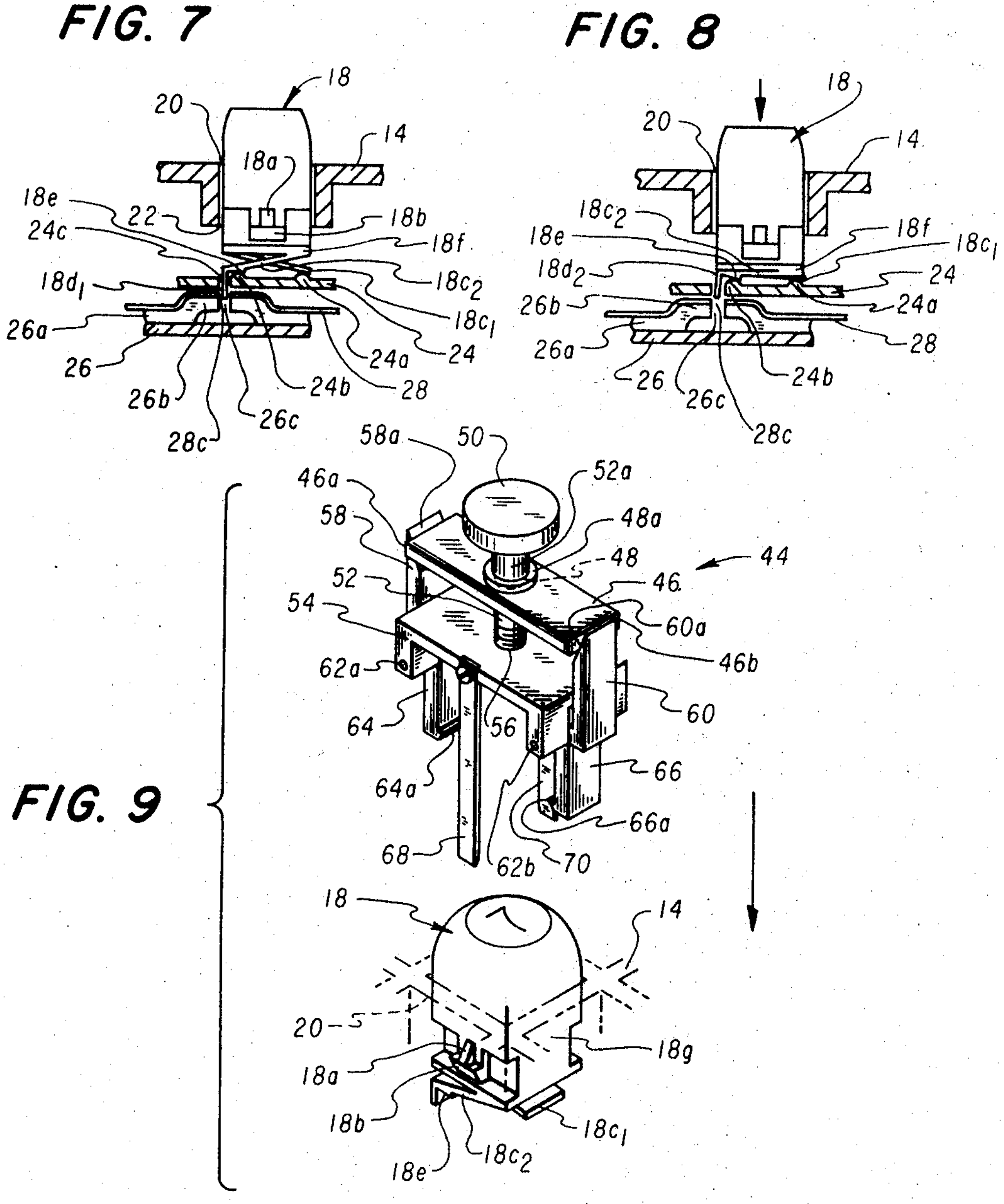
FIG. 7 is a side view of a typical one-piece key of the invention in its unoperated condition, showing the interruption of the optical transmission path by the presence of a shutter in a gap in the fiber.

FIG. 8 is a side view of a one-piece key in accordance with the invention in its depressed condition, with the underlying resilient legs having been compressed, thereby removing the shutter from the gap in the optical fiber; and FIG. 9 is a perspective view of an extractor tool in accordance with the invention for removing a key, illustrative the extractor above the key preliminary to the extraction step.

THE OVERALL MODULE ARRANGEMENT

Figure 1:
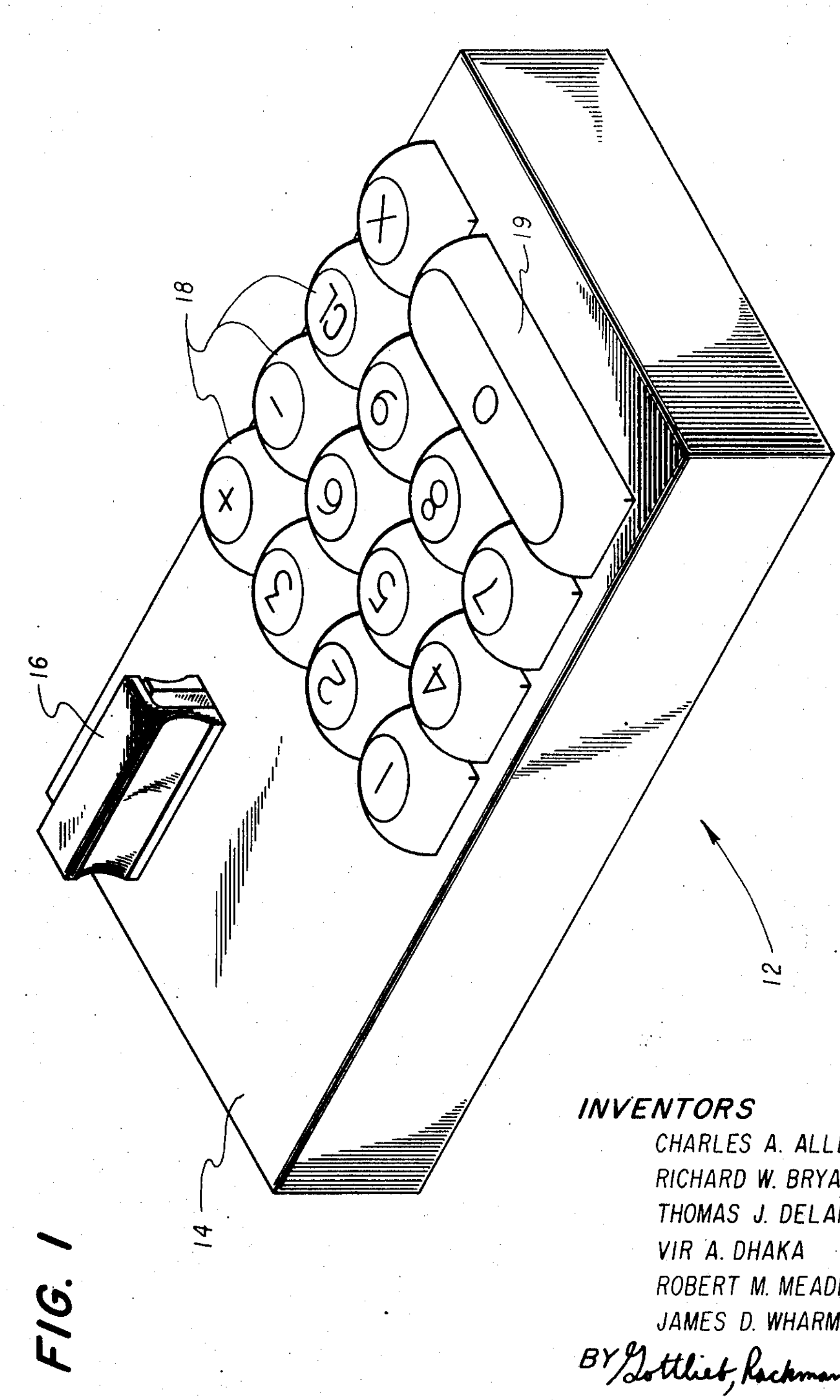
FIG. 1 is a perspective view of a modular section of a keyboard in accordance with the present invention illustrating the plurality of keys and the lamp housing.
Figures 2, 3:
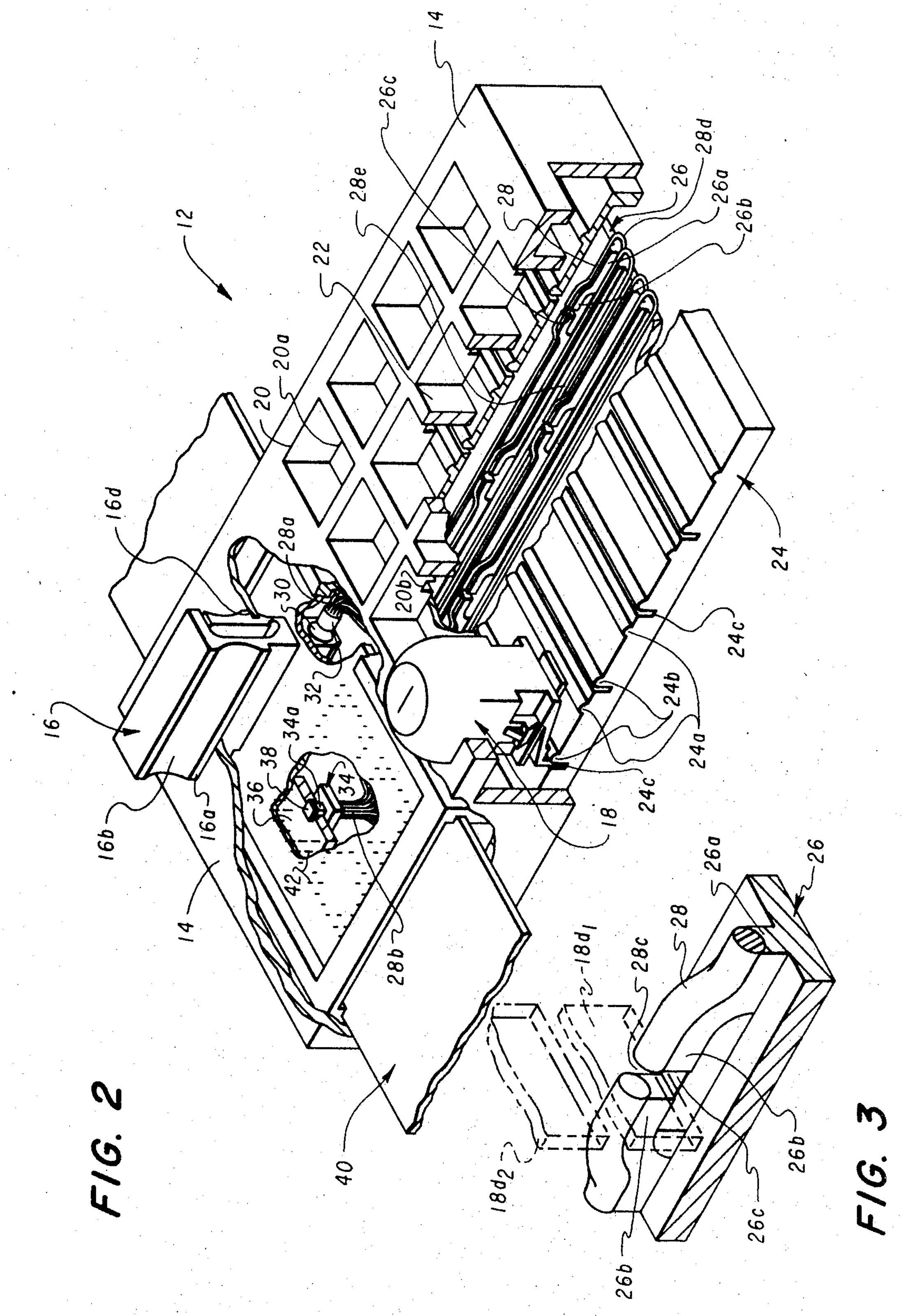
FIG. 2 is a perspective view of the keyboard module, broken away to illustrate the underlying support frame and optical transmission system, and also to illustrate the connections from the output of the optical fibers to the semiconductor chip including a printed circuit board.
FIG. 3 is a enlarged fragmentary view of the optical fiber support plate and a typical optical fiber having a gap therein, with the two possible positions of the key shutter being illustrated in phantom line.

A single keyboard module 12 incorporating the principles of this invention is illustrated in FIGS. 1 and 2. Broadly considering the module 12 as illustrated in FIG. 1, an upper casing 14 receives therethrough a lamp housing 16 and a plurality of keys 18 which may have any of the wide variety of lengends or characters embossed or printed thereon. As is also illustrated in FIG. 1 (and also see FIG. 4B), one of the keys may be a multipe position bar such as 19.

The partially broken-away view of FIG. 2 reveals the basic construction of module 12 as it could be used in a typical machine application, and in particular, illustrates th anner in which keys 18 operate to provide an appropriate signal to the system indicative of the depressing of such key. Each key 18 is received within a corresponding seat or aperture 20 which includes a lower substantially square periphery 20*a*. Each of these key apertures 20 is defined by the presence of discrete walls 22 depending downwardly from the upper surface of casing 14. At the lower terminus of each of walls 22 (and thus at the bottom of each of key apertures 20) is a key support frame 24 which underlies at least the entire key portion of casing 14. Support frame 24 includes four pairs of ridges 24*a*, 24*b* which are disposed in transverse rows and which extend for the entire width of module 12. One such ridge pair is provided for each row of keys 18. As can be seen from FIGS. 7 and 8 as well as from FIG. 2, key 18 includes crossed legs $\mathbf{18}c_1$ and $\mathbf{18}c_2$ which rest on ridges 24*a* and 24*b*, respectively. Immediately forward of each transverse ridge 24*b* is transverse slot 24*c* which also extends across the entire width of frame 24 and module 12. The presence of slot 24*c* in frame 24 defines an access slit for key shutter element 18*d* which is disposed within slot 24*c*.

THE LIGHT TRANSMISSION SYSTEM

The responsive portion of the signalling system of the invention, consisting of light-transmitting optical fibers adapted to transmit light to detector location in response to the depressing of keys, is located beneath key support frame 24. The signalling system comprises fiber support plate 26 and a plurality of individual support grooves 26*a* projecting up from plate 26. As illustrated in FIG. 2, there are four support grooves 26*a* for each column of keys 18, i.e., there is one such support groove for each key 18 and key aperture 20 of a given column. The broken-away portion of casing 14 and frame 24 as illustrated in FIG. 2 reveals the structure underling the second column of keys from the left for module 12, and one of the elevated support grooves 26*a* is present for each key 18 and key aperture 20 in that column of the module. Also considering FIG. 3, each groove 26*a* includes a further evelated portion 26*b* adapted to permit interruption of a corresponding optical fiber 28 supported by the groove; a gap 26*c* is present between opposed segments of raised region 26*b*, and there is a corresponding narrow gap 28*c* in the optical fiber itself. (The gaps 26*c* and 28*c* in the groove support and optical fiber respectively are exaggerated for purposes of illustration in FIGS. 2, 3, 7 and 8.)

The precise manner of light transmission and interruption indicative of the depressing of a particular key will be covered in greater detail below — it is sufficient to point out at this time that shutter element 18*d* of key 18 is adapted to normally be disposed in gap 28c of optical fiber 28, thus interrupting any light transmission which would otherwise be carried by optical fiber 28. Then, when key 18 is depressed, shutter element 18*d* is withdrawn from gap 28b and light transmission is permitted along the corresponding optical fiber 28.

Figures 5, 6:
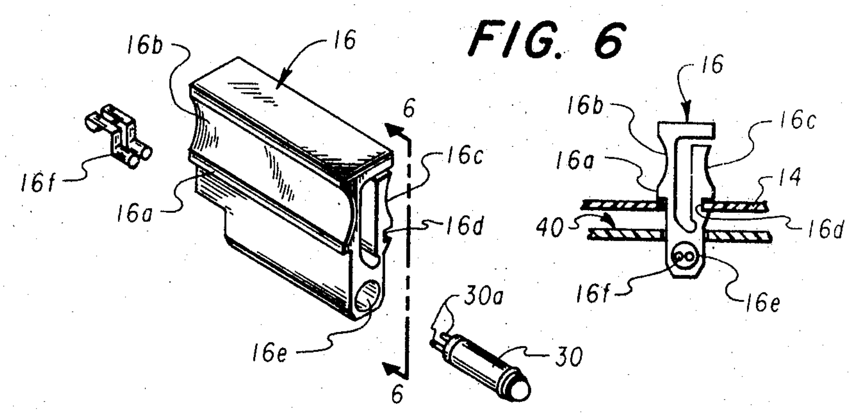
FIG. 5 is an exploded perspective view of the lamp housing individual to each modular keyboard section, illustrating the housing proper, the lamp contacts and a cylindrical lamp.
FIG. 6 is a front view of the lamp housing seated on the module casing as shown in FIGS. 1 and 2, taken from the perspective of line 6—6 of FIG. 5 in the direction of the arrows.

The light source for any given module 12 is provided from within lamp housing 16. As illustrated in FIGS. 2, 5 and 6, housing 16 includes a shoulder 16*a* on one side which rests on the upper surface of casing 14 towards the rear of the module, and a recess 16*d* on the other side of the housing to receive a longitudinal portion of casing 14. Thus, as shown in FIG. 6, housing 16 normally resides in a rest position defined by the engagement of shoulder 16a and recess 16d with casing 14. Light is provided for all of the optical fibers of any given module (that is, all sixteen fibers of module 12) from lamp 30 which is received in cylindrical socket cavity 16*e*. Each of the optical fibers 28 emanates from a random bunching of such fibers 28a grouped within collar 32 to receive light from lamp 30. When power is supplied to the system, lamp 30 is lit and light is initially transmitted along each of the optical fibers 28 contained in grouping 28*a* (FIG. 2). However, until a key 18 is depressed, the light transmission thereby supplied by lamp 30 will not go beyond the gap 28c in any of the corresponding optical fibers because of the presence therein of key shutter 18*d*.

The light transmission path for any one optical fiber 28 commences with the light generated by lamp 30 within socket 16*e* of lamp housing 16. Referring to FIG. 2, such light is received at the bunching of optical fibers 28*a* within collar 32. Considering any one optical fiber, light is transmitted along such fiber until it reaches gap 28*c* formed in the optical fiber, which corresponds to a similar spacing 26*c* in the underlying groove 26*a* of support plate 26. In the unoperated position, shutter element 18*d* of key 18 will be interposed in gap 28*c* in the light transmission path for an optical fiber 28 by occupying the position shown at $18d_1$ in FIGS. 3 and 7. In that event, no light will pass from the rearward end of an optical fiber 28 to the forward end thereof. When, however, key 18 is depressed (e.g., see FIG. 8), the shutter element is elevated to the position illustrated at $18d_2$ in FIGS. 3 and 8, thus removing the interruption in the light transmission path for an optical fiber 28. Accordingly, the light is then transmitted across the gap 28*c* in the optical fiber gap 28c is illustrated in all figures exaggerated from the actual dimension — in practice, the gap 28*c* between the two separated portions of optical fiber 28 will only be about 0.010 inches and will proceed through the remainder of the optical transmission path, including U-shaped curve 28d and back towards the detecting region to be discussed below via straight and uninterrupted fiber optical portion 28*e*.

THE DETECTING COMPONENTS

The light outputs of the 16 optical fibers corresponding to each of the keys of module 12 are received, also in a bunched fashion, at 28*b* in FIG. 2. Here, however, as opposed to bunching 28*a*, each of the individual output ends 28b of the fibers is arranged in definite and discrete fashion, and in particular, is associated with a corresponding photodetecting element on the undersurface of chip 38. As shown in FIG. 2, and as also described in copending application Ser. No. 62,298 filed Aug. 10, 1970, and assigned to the assignee of the present application, each of optical fibers 28 in group 28*b* is guided to a specific location on the undersurface of chip 38 at which a photodetector for that fiber will be located. This is achieved by including one channel through housing 34 for each optical fiber, with the fibers being carried through to the upper surface of housing block 34*a*. For example, the upper surface of housing block 34*a* may act as the terminating surface for each of the optical fibers 28, and in particular, may have the polished ends of such fibers substantially flush with such upper surface. Arrayed opposite to each of the polished ends of optical fibers 28 as they carry their respective light outputs upward through block 34*a*, is a corresponding photodetecting element (not shown) on semiconductor chip 38 (see the above identified copending application).

The circuitry connections for the system are included on ceramic substrate or module 36 and on printed circuit board 40. (The embodiment of the invention illustrated in FIG. 2 omits any showing of the conventional metallizing circuitry coupling portions of semiconductor chip 38 to ceramic module 36.) Connections from the discrete photodetectors on chip 38 to corresponding conductive pins 42 projecting upward from ceramic substrate 36 permit output indications, resulting from the depressing of keys 18, to be transmitted to appropriate regions on printed circuit board 40. For example, the depressing of a particular key provides a light output at the upper surface of housing block 34a which is detected by the corresponding one of the sixteen photodetectors on chip 38. The electronic output from chip 38 is, in turn, coupled to one or more of pins 42 projecting upward from the surface of module 36. As is well known, the module pins 42 are connected to the upper surface of printed circuit board 40 by holes in the printed circuit board surface, and the pins 42 may actually project beyond the upper surface of board 40. The upper surface of board 40 includes conductive metallized portions (not shown) which furnish appropriate electronic outputs, for example to a memory unit, to provide an indication that a particular key has been depressed. In the alternative, the electronic output signal can be provided merely to a visual read-out device (e.g., a cathode ray tube screen), to give an operator an indication of the accuracy of the input character. The processing of information from modules such as 36 and circuit boards such as 40 is generally well known and need not be described herein.

THE KEY LAYOUTS

Figure 4A:
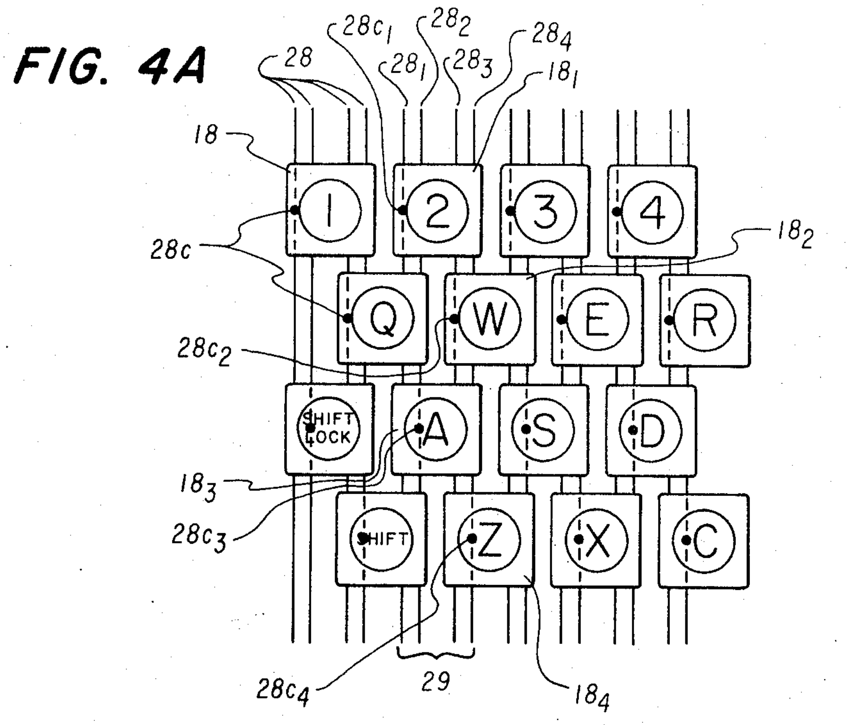
FIG. 4A is an illustrative array of keys corresponding to one typical keyboard module, illustrating the relationship between the keys and the underlying optical fibers, with the corresponding gaps therein being indicated by the dots.
Figure 4B:
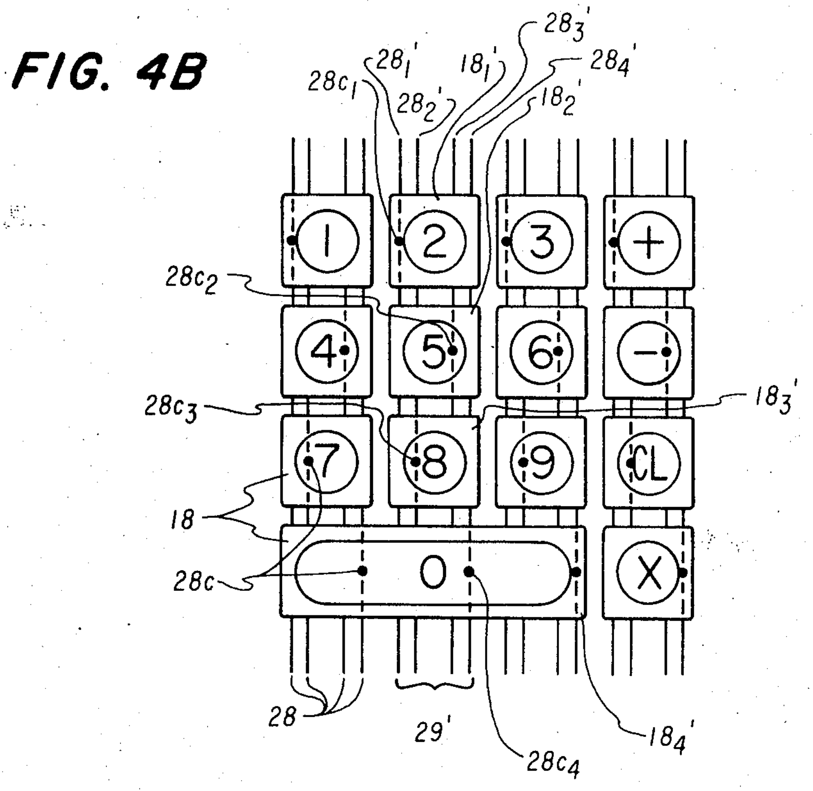
FIG. 4B is an alternate arrangement of keys for the same basic modular keyboard section, utilizing the same underlying fiber optical transmission system as in FIG. 4A.

The versatility of a keyboard formed by one or more modules such as 12 (FIGS. 1 and 2) is dempnstrated by the key layouts shown in FIGS. 4A and 4B. Thus, either one of those key arrangements can be utilized with the very same underlying fiber optics network, thus permitting interchangeability of keyboard character layout, including the use of multiple position or character keybars and various other alternative key orientations. In both FIGS. 4A and 4B, the vertical lines represent optical fibers 28 which pass beneath keys 18 (the dashed portions of fibers 28 as illustrated in FIGS. 4A and 4B). The heavy dots associated with each key 18 and each optical fiber 28 represents the gaps 28*c* in the optical fibers' transmission paths as illustrated in FIGS. 2, 3, 7 and 8. Thus, any given dot represents the gap in the transmission path beneath a key 18 in which shutter 18*d* is normally disposed.

Considering the "offset" keyboard illustrated in FIG. 4A, the second column of such key arrangement consists of keys $18_1$, $18_2$, $18_3$ and $18_4$. In the particular layout illustrated in FIG. 4A, it is noted that keys $18_1$ and $18_3$ are aligned vertically with each other, while keys $18_2$ and $18_4$ are offset from the first-mentioned pair of keys, but are aligned with each other. Despite this offset arrangement, all keys in this second offset column activate respective ones of light transmitting optical fibers 28 in the corresponding group 29 of such optical fibers. Such "activation" means the withdrawal of a corresponding shutter 18*d* from the underlying gap 28*c* in the optical fiber 28, thereby permitting light to be transmitted past the gap in the optical fiber to the discrete array of optical fibers 28*b*, ultimately reaching chip 38 through housing 34 as shown in FIG. 2.

Specifically considering the second discontinuous column of keys 18 illustrated in FIG. 4A, the uppermost key $18_1$ overlies each of the optical fibers of group 29, but its shutter element 18*d* is only disposed above gap $28c_1$ in optical fiber $28_1$. Proceeding down the discontinuous second column of the keyboard, key $18_2$ overlies only optical fibers $28_3$ and $28_4$ of group 29 and overlaps into the next group of four optical fibers relating to the third column; significantly however, key $18_2$ overlies gap $28c_2$ in optical fiber $28_3$ of group 29, thus providing for the optical transmission by that fiber when key $18_2$ is depressed. Similarly, key $18_3$, which is aligned with key $18_1$, overlies all four of the optical fibers of group 29 and in particular, has its shutter element 18*d* aligned with underlying gap $28c_3$ in optical fiber $28_2$. Finally, key $18_4$, which is aligned with key $18_2$, has its shutter element 18*d* overlying gap $28c_4$ in optical fiber $28_4$. This type of offset keyboard may be desirable for a typical typewriter keyboard in which the characters are arranged substantially in the fashion indicated in FIG. 4A — for this reason, the specific numerals, letters and control keys illustrated within the circles of each of keys 18 in FIG. 4A have been added for illustrative purposes only. By the use of such a keyboard for a data processing system input device, a typist who has been familiar with ordinary typewriters can make a smooth and easy transition to the input devices adapted for computers.

The "even" or squared-off keyboard module illustrated in FIG. 4B operates with the same underlying fiber optical network as that used in connection with the offset keyboard of FIG. 4A. Thus, by simply using an appropriate key aperture arrangement on casing 14 as shown in FIG. 2, either a squared-off keyboard or an offset keyboard may be employed. In fact, the keyboard aperture arrangement shown in FIG. 2 as providing for a 4 × 4 square array of key apertures 20 is suitable only for the keyboard illustrated in FIG. 4B; a different and obviously offset aperture arrangement (not shown) would have to be provided (by means of a different casing 14) for the offset keyboard of FIG. 4A. But, no changes in the construction of each of keys 18 would have to be made in order to accommodate the keyboard orientation illustrated in FIG. 4B, as opposed to that illustrated in FIG. 4A. Since the width of key shutter element 18*d* is substantially the entire width of the corresponding key 18, the gap 28*c* in which shutter 18*d* is normally disposed (to prevent light transmission) and from which it is withdrawn upon the depression of the key (to permit light transmission), can be reached by the shutter through slot 24*c* in key support frame 24, as long as the gap is disposed beneath some part of the corresponding key. Accordingly, the gap 28*c* which underlies any particular key 18 may be located at any point beneath such key which is in line with its shutter 18*d* when it is disposed within access slot 24*c*.

Further, in this regard, consideration is now given to the second column of keys in FIG. 4B. The leftmost optical fiber in group 29' is identified as $28_1'$ and its corresponding gap $28c_1$ underlies the shutter element 18d of key $18_1'$ of the second column of keys in FIG. 4B. Proceeding down the straight column, the second key $18_2'$ has its shutter element 18d which overlies gap $28c_2$ in optical fiber $28_3'$ of group 29'. The third key is $18_3'$, the shutter 18*d* of which is normally disposed within gap $28c_3$ of optical fiber $28_2'$. Finally, the lowermst key $18_4$ in the second column in FIG. 4B is a common character bar also embracing the first and third columns of that particular keyboard module. The central portion of key bar $18_4'$ overlies three different gaps 28*c* in three different optical fibers, but for purposes of this discussion, the most significant one of such gaps is $28c_4$. Although the shutter element of key bar $18_4'$ can extend, as with the other keys 18, for the entire width of the key bar $18_4'$, it is only necessary to detect the transmission of light through one of the three optical fibers whose gaps 28*c* underlie bar $18_4'$. Accordingly, the shutter 18*d* of key bar $18_4'$ need only be made the width of one of the keys 18, such that depressing key bar $18_4'$ will cause only the withdrawal of shutter 18d from gap $28c_4$ of optical fiber $28_4'$. This will be interpreted by the detecting circuitry as equivalent to the withdrawal of a corresponding shutter 18*d* from eithr one of the other underlying gaps 28*c*. If three separate keys are desired in lieu of common bar $18_4'$, then the other gaps underlying such keys will operate in the usual manner described with respect to the individual keys. The particular keyboard illustrated in FIG. 4B may be desirable for use in adding machines and other calculating devices in which the keyboard designations illustrated in FIG. 4B are typical in prior art machines of this kind — accordingly, an operator well versed in such machines could easily make the transition to computer input devices utilizing comparable keyboards of the type illustrated in FIG. 4B.

In comparing the keyboards of FIGS. 4A and 4B, it is noted that each of the keys 18 in FIG. 4A includes its underlying gap 28*c* in the left half of the corresponding key, where the corresponding shutter element 18*d* interrupts either the leftmost underlying optical fiber or the adjacent fiber to the right. However, in the keyboard of FIG. 4B, there is complete distribution of the relationships between the keys and their shutter elements and the underlying gaps, with the first row of keys 18 interrupting the light transmissions in the gaps 28*c* which underlie the keys at the leftmost region; the second row of keys 18 interrupts gaps in the third optical fiber from the left under each such key; the third row of keys interrupts light transmission in gaps in the second from the left of the optical fibers underlying the keys; and the fourth row of keys (including key bar $18_4'$) interrupts the light transmission in the gaps in the rightmost underlying optical fibers with respect to those keys. Different arrangements can be worked out regardless of the orientation of the keys themselves because of the relative width of a shutter element 18*d* and the possibility of its being disposed within an underlying gap 28*c* anywhere along the width of the key 18.

In describing the keyboard layouts of FIGS. 4A and 4B, the second column of keys has been emphasized because of the broken-away portion of FIG. 2. That latter illustration shows parts of frame 24 and keyboard casing 14 removed for the sake of clarity to reveal the underlying optical fibers 28 corresponding to the second column of keyboard module 12. As has already been noted, the module 12 illustrated in FIG. 2 is designed to accommodate the key arrangement of FIG. 4B; an offset arrangement of key apertures 20 on a casing would be utilized for any module (not shown) to accommodate the keyboard arrangement of FIG. 4A. However, it is important to point out that regardless of which key layout is employed, the same underlying fiber optical light transmission network would be utilized. This is the network shown broken away in FIG. 2. The uppermost key in the second column of module 12 (or a comparable offset module) would have its shutter element 18*d* normally disposed within the gap 28c of the leftmost optical fiber 28 in the second column grouping of such fibers as illustrated in FIG. 2 — this corresponds to optical fibers $28_1$ and $28_1'$ in FIGS. 4A and 4B, respectively. The other keys each similarly include shutter elements 18d which are normally disposed within gaps 28c of the other three corresponding optical fibers of the second column grouping for module 12. These are the fibers in group 29 for the keyboard layout illustrated in FIG. 4A and in group 29' for the layout shown in FIG. 4B. Upon depression of the respective key, its corresponding shutter element 18d will be elevated and thereby removed from the underlying gap 28c in which it normally resides. This permits light transmission to travel down the fiber towards segregated bunching 28b and through housing 34 to the discrete photodetecting devices included on the undersurface of chip 38.

THE OPERATION OF THE KEYS

The operation of any given key 18 in normally interrupting light transmission along an optical fiber 28 and the manner in which such light transmission is initiated in response to the depressing of such a key can be understood further by a consideration of FIGS. 2, 3, 7 and 8. In the normal condition, key 18 is in an upper position as illustrated in FIG. 7. Thus, while the key is disposed within an aperture 20 of casing 14, it is supported in the upper position illustrated in FIG. 7 by the expanded orientation of crossed resilient legs $18c_1$ and $18c_2$ which project downward from the bottom of the key. As shown, for example, in the bottom portion of FIG. 9, leg $18c_1$ can conveniently be constructed in the form of a tongue which is narrower than the overall width of leg $18c_2$. The latter leg can be constructed of two side struts forming a substantially rectangular aperture therebetween to accommodate leg $18c_1$ therein. In the position illustrated in FIG. 7, in which legs $18c_1$ and $18c_2$ are in their rest conditions, leg $18c_1$ would therefore pass through the rectangular aperture formed by the side struts which make up leg $18c_2$.

The rest position of FIG. 7 is defined by the residence of resilient leg $18c_1$ on rearward ridge 24a of frame 24; similarly, flat region 18e towards the forward portion of resilient leg $18c_2$ rests upon forward ridge 24b of frame 24. The entire key 18 is molded of a suitable plastic material such as nylon and legs $18c_1$ and $18c_2$ thereby have the necessary resilience to normally support key 18 in the orientation illustrated in FIG. 7, such that the weight of key 18 is insufficient to distrub the resilient supporting relationship established by the key's legs.

Because of the geometry of the undercarriage of key 18, light transmission along optical fiber 28, as illustrated in FIG. 7, is normally prevented. Just forward of ridge 24b upon which leg $18c_2$ rests, slot 24c is formed in frame 24. This provides access therethrough for shutter 18d of key 18 — in FIG. 7, and in the lower phantom view of the shutter in FIG. 3, the shutter rest position is given as $18d_1$. This position interposes the lower terminus of the shutter in the gap 28c formed in optical fiber 28. As noted from FIG. 7, this gap coincides with a corresponding gap 26c in support groove 26a, the gap 26c being formed between the elevated regions 26b of the support groove 26a. Thus, any light traveling from left to right along optical fiber 28 in FIG. 7 will be blocked at gap 28c by the interposition of the key shutter in position $18d_1$.

When key 18 is depressed, as indicated by the arrow in FIG. 8, the lower position of key 18 illustrated in FIG. 8 is assumed. Thus, as key 18 moves downwardly within the channel established by aperture 20, legs $18c_1$ and $18c_2$ are compressed upward toward the main body of key 18. As a consequence of this downward movement compressing the legs, the right edge of key 18 is lowered into contact with the right hand terminus of leg $18c_1$ as itrests on ridge 24a. Downward pressure on key 18 forces the left edge of resilient leg $18c_2$ upward because of the moment established for leg $18c_2$ about the corner region 18f of the undercarriage of key 18. This rotational moment causes the slight upward deformation of flat surface 18e as it presses against ridge 24b. Ultimately, the maximum downward stroke of key 18, as shown in FIG. 8, will be reached, with key legs $18c_1$ and $18c_2$ in their maximum compressed positions nearly parallel to the horizontal surface of frame 24. At that point, the shutter position will be that illustrated at $18d_2$ in FIG. 8. The upper phantom showing in the enlarged view of FIG. 3 shows the shutter at position $18d_2$ having been withdrawn from the gap 28c in optical fiber 28.

Light transmission along the previously interrupted optical fiber 28 can then occur, based on light emanating from lamp 30 within housing 16. The light passes from fiber bunching 28a along the optical fiber and now bridges the gap 28c as the light proceeds from left to right in FIGS. 7 and 8. The light continues to be transmitted along curve 28d of the fiber and back towards the detecting portion of the system along unbroken portion 28e of optical fiber 28. The light is received within grouping 28b of optical fibers 28 and the individually lit fiber has its light communicated to a corresponding photodetector on the undersurface of chip 38 via an individual channel for that fiber within fiber optical housing 34.

When the downward pressure on key 18 is released, the key once again assumes the position illustrated in FIG. 7, whereby the shutter is at position $18d_1$ interrupting light transmission along optical fiber 28, corresponding to the lowe phantom position of the shutter in FIG. 3. The key 18 can then be reactived at any time to once again withdraw shutter 18d from optical fiber gap 28c to provide an output signal to the semiconductor chip 38.

THE REMOVABLE LAMP HOUSING

As part of the versatility of the modular keyboard of the present invention, the lamp housing which carries the light source to illuminate the input ends of the several optical fibers in a given module is removable to permit easy access to and replacement of the light source. The housing 16 is illustrated generally in FIG. 1, and in FIG. 2, the broken away portion at the rear of module 12 reveals that lamp housing 16 has its upper portion elevated above casing 14 and extends downward through casing 14 and then through a blank section of printed circuit board 40, beneath which is the illuminating portion of the housing. Beneath the broken-away part of circuit board 40, as seen in FIG. 2, only the portion of lamp 30 which illuminates the input ends of the optical fibers in bunching 28a within collar 32 is visible. From FIG. 2 it is apparent that housing 16 remains in position by virtue of shoulder 16a resting on casing 14, together with the mating of casing 14 in recess 16d in the opposite side surface of housing 16.

A more complete understanding of the construction and positioning of lamp housing 16 can be obtained from FIGS. 5 and 6. The perspective exploded view of FIG. 5 shows that the main body of housing 16 includes ridge 16*a* defining an underlying shoulder (which rests on the upper surface of casing 14 at the rear of module 12 (see FIG. 2), above which is a concave section 16*b* to provide a gripping surface for the ultimate removal of housing 16 from module 12. Further considering FIG. 6 as well, housing 16 is seen to have an irregular U-shape, with concave portion 16*b* defining a part of the left branch of the U and a similar concave portion 16*c*, which is separated from the top surface of the housing, defining the right branch of the U. In its normal position as shown in FIG. 6, lamp housing 16 rests upon the upper surface of the module casing 14 with the shoulder defined by ridge 16*a* at the left side of the housing; on the opposite side of housing 16, casing 14 actually resides within housing slot 16*d.*

Below circuit board 40 is the illuminating region for the housing including cylindrical lamp cavity 16e which accommodates cylindrical lamp 30, illustrated in FIG. 5. At the rear of socket 16*e* are pin contacts 16f which receive rearwardly projecting pins 30*a* of lamp 30 when the lamp is inserted in cavity 16*e*.

As will be appreciated, it may occasionally be necessary to replace lamp 30 if it burns out or if it somehow proves to be defective. The construction of lamp housing 16 and module 12 facilitates such lamp replacement. The operator merely applies opposing and inwardly directed forces to concave side elements 16*b* and 16*c* of housing 16, for example by placing this thumb and forefinger to those respective elements of the housing. Since lamp housing 16 will be constructed of a suitable resilient plastic material (e.g., nylon), the opposed branches of U-shaped housing 16 will be compressed towards each other, thereby disengaging slot 16d from casing 14. Since there is no corresponding recess on the opposite side of housing 16, but merely an upper shoulder defined by ridge 16*a* which prevents any downward excursion of lamp housing 16 from its rest position, the disengagement of slot 16d from casing 14 will permit lamp housing 16 to be withdrawn upwardly through the opening in casing 14, thereby permitting an operator to have ready access to the entire housing for lamp replacement. Since contacts 16*f* merely make contact with appropriate power leads on the top of printed circuit board 40, and contacts 16 will be made of a resilient metal, this will offer no substantial resistance to the withdrawal of housing 16 from its rest position.

A new lamp 39 can then be provided for insertion within cavity 16*e*, with its pins 30*a* being received in contacts 16f. Opposing housing branches 16*b* and 16*c* are then compressed by the operator and housing 16 is lowered into the gaps in casing 14 and printed circuit board 40 until the position illustrated in FIG. 6 is again reached. At this point, the operator relaxes the inward compression forces on housing branches 16*b* and 16*c;* during installation of housing 16, the rear pick-up portions of contacts 16f will again have been placed in contact with power leads on printed circuit board 40. When power is supplied to the system thereafter, lamp 30 will again be operative to illuminate the ends of the optical fibers bunched at 28a within collar 32,

THE EXTRACTION OF A KEY

The replaceable aspect of the invention is further exemplified by the showing of FIG. 9, in which a key extractor 44 is shown positioned over a typical key 18 within module 12.

Extractor 44 is arranged to be lowered over a key 18 seated in module casing 14 (e.g., see FIGS. 1 and 2), grip two opposing side faces of the key and two ramp like elements on the remaining two opposed side faces, thereby permitting the individual key to be extracted from its otherwise fixed position within module 12. Extractor 44 includes an upper control plate 46 having a central aperture 48 covered by washer 48*a*. Aperture 48 is unthreaded and accommodates the unthreaded portion of shaft 52 of bolt 50. The lower end of shaft 52 has external threads and is received within internally threaded hole 56 in inverter U-shaped bracked 54.

The shorter ends of upper control plate 46 are designed to come in contact with upper inclined surfaces 58*a* and 60*a* of side grippers 58 and 60, respectively. Grippers 58 and 60 are coupled to bracket 54 by means of pins 62*a* and 62*b*, permitting a slight inward pivoting of respective lower legs 64 and 66 of grippers 58 and 60 about their respective pins. Each of legs 64 and 66 is formed with an inwardly projecting jaw 64*a* and 66*a*, respectively. The final portion of extractor 44 is a pair of opposed fingers 68, 70 mounted on opposite sides of bracket 54; fingers 66, 70 are formed of resilient metal arranged to resist any outwardly directed force — thus, gripping fingers 68 and 70 will tend to return to their substantially vertical orientations as illustrated in FIG. 9, although they may be expanded outwardly during a portion of the extraction process.

The actual extraction of a typical key 18 is indicated by the downwardly pointing arrow to the right of FIG. 9. In other words, extractor 44, substantially in the condition illustrated in the upper half of FIG. 9, is lowered over key 18. The relative dimensions of extractor 44 and key 18 are such that when extractor 44 is lowered over key 18, opposed jaw 65*a*, 66*a*, clear the corresponding underlying side surfaces of key 18, one of which is hidden at the rear of key 18, and the other one of which (cleared by jaw 66*a*) is identified as side surface 18*g*. The initial contact between extractor 44 and key 18 is made by virtue of resilient fingers 68, 70 which also clear their corresponding side surfaces of the main portion of the key body, but whose opposed surfaces make contact with respective ramp members 18a on the two correspondingly opposed surfaces of key 18 (only one of ramps 18a is illustrated in FIG. 9, the other being hidden to the right rear of the drawing).

The lowering of extractor 44 need proceed only to a point where latches 18*b* are depressed by fingers 68 and 70, at which position jaws 64, 66 are arrayed opposite the corresponding side surfaces 18*g* of key 18. At that point, the fingers have slid down the ramps 18*a* on the other two opposed surfaces of the key whereupon latches 18*b* will be released. Gripping fingers 68, 70 are constructed of sufficient length so that they are permitted to travel downwardly along the entire extent of ramps 18*a* to establish a releasing relationship with the inwardly inclined underlying ramps 18*b*.

Bolt 50 is rotated in a clockwise direction to initiate the gripping of the key. As bolt 50 continues to be rotated through opening 48, the progressive mating of the threads on shaft 52 with the internal threads in aperture 56, together with the limitation on downward movement of bolt 50 because of the interaction of enlarged bolt shaft portion 52*a* and washer 48*a*, results in the gradual lowering of closure control plate 46 with respect to the remainder of extractor 44. In other words, plate 46 is gradually forced downward along the unthreaded portion of shaft 52 as bolt 50 is rotated — although it would normally be possible for bracket 54 to move upward rather than plate 46 moving downward, the gripping relationship of claws 68*a* and 70*a* on key 18 initially precludes any upward movement of bracket 54.

Accordingly, as plate 46 is forced downward, its short ends 46*a*, 46*b* come in contact with respective inclined surfaces 58*a*, 60*a* of side grippers 58, 60.

Since the surfaces of ends 46*a*, 46*b* of plate 46 are substantially vertical, their respective lower edges will shortly come into contact, during the downward excursion of plate 46, with the inclined surfaces 58*a*, 60*a* of grippers 58, 60, respectively. Grippers 58 and 60 will thereupon commence pivoting about respective pins 61*a*, 62*b*, with lower leg portions 64, 66 each pivoting inwardly towards the corresponding faces 18*g* of key 18. After some further downward movement of plate 46, accompanied by corresponding additional pivoting of the grippers 58 and 60 as described above, opposed jaws 64*a*, 66*a* will come into contact with corresponding side faces 18*g* of key 18. As bolt 50 continues to be turned past the point of such contact, the further downward movement of plate 46 and the pivoting of grippers 58 and 60 in response thereto will cause jaws 64*a* and 66*a* to actually "bite" into the side surfaces 18*g* of key 18. Since key 18 is of an appropriate plastic, jaws 64*a*, 66*a* will be capable of actually denting the corresponding surfaces 18*g* to establish a slight gripping recess therein. When that point of gripping has been firmly established, the necessary gripping relationship between extractor 44 and key 18 exists on two sides of key 18 by virtue of the indentations formed by jaws 64*a*, 66*a* in opposed faces 18*g*.

Following the establishment of this gripping relationship, no further rotation of bolt 50 is required. The operator simply grasps bolt 50 and urges it upwardly, thereby withdrawing key 18 from its seat within key aperture 20. Following the extraction step, bolt 50 can then be rotated in a counterclockwise direction so that bracket 54 will now move downwardly within extractor 44. Jaws 64a and 66a of grippers 58, 60 will gradually relax their gripping movement on corresponding side surfaces 18g of key 18. When grippers 58 and 60 have returned to their original orientations (as illustrated in the upper half of FIG. 9), jaws 64*a* and 66*a* will no longer be in contact with opposed side surfaces 18*g* of key 18. Thus, key 18 is permitted to be withdrawn from extractor 44. If key 18 is mechanically defective, it will probably be discarded. The extractor is then available for further use to remove other defective or unwanted keys.

It is to be understood that the above described embodiments are merely illustrative of the application of the principles of the invention. Numerous other applications can be devised by others skilled in the art without departing from the spirit and scope of the invention.

What is claimed is:

1. A module for forming a keyboard comprising a plurality of keys mounted on said module, light transmitting means for providing signals indicative of the stage of each of said keys, shutter means formed integral with each of said keys for selectively enabling and disabling said light transmitting means in response to the operation and release of each of said keys, and detecting means responsive to said light transmitting means for generating output signals corresponding to the state of said keys, said light transmitting means includes a plurality of light conductors corresponding to said plurality of keys, each of said light conductors having two segments defining a space therebetween, and wherein said shutter means includes a projection adapted to be selectively interposed in and withdrawn from said space when said key is selectively operated and released, and each of said light conductors comprises an optical fiber.

2. A module in accordance with claim 1 wherein said light transmitting means includes a light source for illuminating at least one segment of each of said light conductors, and wherein the position of said projection of said shutter means with respect to said space controls the furnishing of illumination to the other of said segments of said light conductors.

3. A module in accordance with claim 1 wherein said projection of said shutter means normally occupies a position interposed in said space when the corresponding one of said keys is released and assumes a position with-drawn from said space when the corresponding one of said keys is operated.

4. A module in accordance with claim 1 including a support plate for said light conductors; a frame enclosing said support plate and said light conductors and having a plurality of openings defining access channels between said shutter means projection and said space in the corresponding one of said light conductors.

5. A module in accordance with claim 4 wherein said suppot plate includes a supporting groove for each of said light conductors, said groove being formed with a gap corresponding to said space in each of said conductors, wherein said openings in said frame are aligned with the corresponding space in said light conductors and gap in said supporting groove.

6. A module in accordance with claim 5 wherein said keys are arranged in a plurality of rows, and including one of said openings in said frame for each of said rows, said openings extending continuously across said module for at least the width of said rows.

7. A module in accordance with claim 6 including four of said rows, each row having four of said keys, said keys defining an offset key arrangement having two of said rows aligned with each other in a first lateral position and the other two of said rows aligned with each other in a second lateral position.

8. A module in accordance with claim 6 including four of said rows, each row having four of said keys, said keys defining a square array having said rows aligned laterally with each other.

9. A module in accordance with claim 4 wherein said keys are arranged in a plurality of rows, and said frame further includes a pair of ridges for supporting said keys on each of said rows, each of said pair of ridges being located with respect to a corresponding one of said open-ings in said frame to position said projection of said shutter means within said space when said key is released and outside of said space when said key is operated.

10. A module in accordance with claim 9 wherein each of said keys includes a pair of resilient legs resting on respective ones of said pair of ridges, said legs being movable between an expanded position when said key is released and a compressed position when said key is operated.

11. A module in accordance with claim 10 wherein said projection of said shutter means is formed integral with one of said legs to cause said projection to be interposed in said space when said legs are in said expanded position and to be withdrawn from said space when said legs are in said compressed position.

12. A module in accordance with claim 1 wherein said light transmitting means includes a light source and a housing to receive said light source, said housing being provided with securement means for releasably attaching said housing to said module.

13. A module in accordance with claim 12 including a casing forming a cover for said module, and wherein said housing is formed with a substantially U-shaped cross-section wherein the opposed side surfaces thereof are compressible towards each other, said releasable securement means comprising a shoulder in one of said side surfaces and a recess in the other of said side surfaces, said shoulder and said recess engaging said casing when said housing is mounted in said module.

14. A module in accordance with claim 13 wherein said housing further includes a socket to accommodate said light source, and wherein said shoulder engages the upper surface of said casing and said recess engages the upper and lower surfaces of said casing, the compressing of said side surfaces serving to disengage at least said recess from said casing.

15. A module in accordance with claim 14 wherein said light transmitting means further includes a plurality of light conductors corresponding to said plurality of keys, said conductors having input ends grouped together, and wherein said light source comprises a lamp inserted in said socket such that said lamp is disposed adjacent to said input ends of said conductors when said housing is mounted in said module.

16. A module in accordance with claim 1 wherein said detecting means includes semiconductor means having a plurality of photocells corresponding to said plurality of light conductors, and a housing receiving said conductors for coupling light transmitted thereby to said photocells.

17. A module in accordance with claim 16 including a circuit board for receiving said output signals, a substrate connected to said circuit board and having said semiconductor means mounted thereon, said substrate including an aperture defining a coupling channel between said housing and said semiconductor means.

18. A modular keyboard system comprising a plurality of keys movable between a released position and an operated position, light transmitting means for producing light signals indicating the position of said keys, said light transmitting means comprising fiber optics elements, each of said keys including means for controlling said light transmitting means in response to the movement of said keys between said released and operated positions, and means for extracting selected ones of said keys from said system.

19. A system as defined in claim 18 wherein each of said keys includes an upper body portion having a plurality of side surfaces, and a lower body portion having retaining means substantially contiguous with at least two of said side surfaces, and wherein said extracting means includes means for gripping said retaining means and at least one of said side surfaces during the removal of said key from said system.

20. A system as defined in claim 19 wherein said upper body portion includes two pairs of opposite side surfaces and said retaining means projects outward of each side surface of one of said pairs, said gripping means contacting the other of said pair of side surfaces and said retaining means.

21. A system as defined in claim 20 wherein said retaining means includes a first ramp projecting outwardly from each side surface of said one pair of side surfaces and a second ramp beneath said first ramp, the junction of said ramp defining a maximum projecting ridge of said retaining means, and wherein said gripping means includes a pair of fingers for passing over said ridge to respective ones of said second ramps and a pair of opposed jaws to grasp respective ones of said other pair of side surfaces.

22. A system as defined in claim 21 wherein said extracting means further includes an upper control plate having a central bore, a bracket beneath said control plate and having a threaded opening aligned with said central bore of said plate, a bolt having a shaft passing through said bore and including a threaded section mating with said threaded opening in said bracket to control the relative separation of said plate and said bracket, means attaching respective ones of said fingers to a corresponding side edge of said bracket, means coupling respective ones of said jaws to the other sides of said bracket for pivoting movement towards each other, and means on said jaws for pivoting said jaws towards each other in response to the lessening of the distance between said plate and said bracket as said bolt is rotated.

23. A system as defined in claim 22 wherein said coupling means includes a pivot pin connecting each of said jaws to a respective one of said other sides of said bracket, said means on said jaws includes an inclined surface on each of said jaws to receive a corresponding edge of said control plate to rotate said jaws about said pivot pins, said jaws further including teeth to grip respective ones of said other pair of side surfaces of said key, and each of said fingers being formed of resilient material, said teeth of said jaws and said fingers defining an extraction mode for said key.

* * * * *